May 13, 1958 D. E. NEEDHAM 2,834,139
COMBINED FISHING ROD HANDLE AND LANDING NET
Filed Jan. 17, 1956
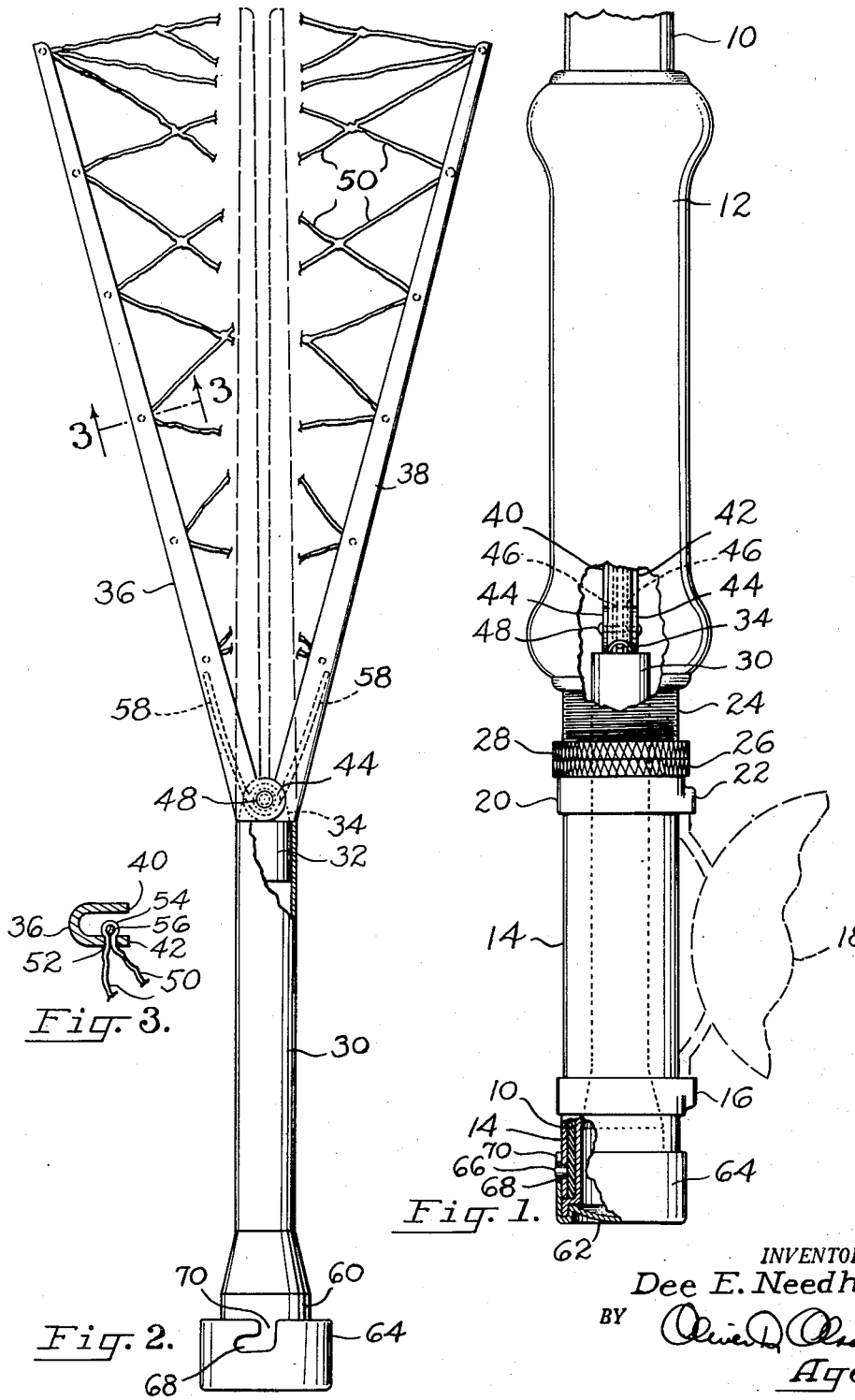
INVENTOR.
Dee E. Needham
BY
Agent

United States Patent Office 2,834,139
Patented May 13, 1958

2,834,139

COMBINED FISHING ROD HANDLE AND LANDING NET

Dee E. Needham, Eugene, Oreg.

Application January 17, 1956, Serial No. 559,651

5 Claims. (Cl. 43—12)

This invention pertains to fishing rods, and relates particularly to a novel construction providing a combined fishing rod handle and landing net.

In many types of fishing, particularly fly fishing, it is required that the hook end of the fishing line be of minimum size and weight in order to effect proper casting of the line. Accordingly, the weakness of the line at this point limits the amount of pull made on the line by the fisherman to set the hook in a fish, and therefore considerable care must be exercised in landing a fish which is hooked to such a slight degree.

In this type of fishing, the use of a landing net is most desirable. However, it is generally recognized that landing nets available heretofore have had to be carried independently of the fishing rod, either in collapsed form or as non-collapsible gear. In the latter instance, the net is cumbersome to carry and frequently becomes ensnared in branches or brush generally associated with fishing sites, or are left behind on a bank while the fisherman wades a stream.

In the case of collapsible landing nets, they are generally carried in a container and must be assembled prior to use. When assembled for carrying, the disadvantages enumerated above also obtain. On the other hand, removal from the carrying case and assembly after a strike has been made is not feasible because it cannot be done with only the one free hand not holding the fishing rod.

It is a principal object of the present invention to provide a fishing rod handle in which a landing net is removably carried in such manner as to be available for immediate use by a simple manipulation of one hand.

Another important object of this invention is to provide a fishing rod handle in which a landing net is removably carried and which net is opened automatically upon removal from the handle.

A further important object of the present invention is the provision of a fishing rod handle carrying a landing net removable therein in such manner that when the net is withdrawn from the handle, it is opened automatically with the open end of the net disposed upwardly in proper position with respect to the hand, for use in scooping a fish from the water.

Still another important object of this invention is the provision of a fishing rod handle carrying a landing net removable therein, which landing net is of minimum but practical size and is light in weight, whereby to maintain proper balance and action of the fishing rod.

Still another object of this invention is to provide a combination fishing rod handle and landing net which is of simplified construction for economical manufacture.

The foregoing and other objects and advantages of this invention will appear from the following detailed description, taken in connection with the accompanying drawing, in which:

Figure 1 is a fragmentary plan view of a combination fishing rod handle and landing net embodying the features of the present invention, parts thereof being broken away to disclose details of construction;

Figure 2 is a plan view of a landing net embodying the features of the present invention, the same being shown in solid lines in opened condition and in dashed lines in closed position ready for insertion in the fishing rod handle; and Figure 3 is a sectional view taken along the line 3–3 in Figure 2 and showing the manner in which the net is secured to the resilient supporting arms.

The fishing rod handle illustrated in Figure 1 is of the type employed with fly rods, wherein the reel is positioned rearwardly of the hand grip. Alternatively, the handle may be of the type employed with casting rods or spinning rods, wherein the reel is positioned forwardly of the handle. In the fly rod the reel is positioned rearwardly of the handle and on the underside thereof, whereas in casting rods the reel is positioned forwardly of the handle and on the upper side thereof for braking control by the thumb. In spinning rods the reel is located forwardly of the handle on the underside thereof. In all instances, the reel is detachably secured to the handle in a position fixed with respect to the fishing line guides which are secured to the fishing rod at longitudinally spaced intervals.

In the embodiment illustrated the rearward section 10 of the fishing rod is hollow and is constructed of glass fiber, in well known manner. Mounted securely upon this section 10 a spaced distance from the rearward end thereof is a hand grip 12 of cork or other suitable material. Extending from the handle to the rearward end of the rod section 10 is a metal sleeve 14, also attached securely to the rod. A reel seat 16 is secured to or otherwise formed integral with the sleeve 14 a spaced distance from the rearward end of the latter, the axis of the reel seat being aligned with the fishing line guides (not shown) provided at spaced intervals along the length of the fishing rod. In this manner, a reel 18 may be secured to the handle in proper alignment with the guides.

Mounted slidably and rotatably on the sleeve 14 forwardly of the reel seat 16 is a ring member 20 formed with a reel seat 22 therein. The reel seat 22 thus may be aligned with reel seat 16 and adjusted along the sleeve 14 to releasably secure the reel 18 to the fishing rod handle. The forward end of sleeve 14 is provided with threads 24 on which are mounted the threaded tightening ring 26 and the lock ring 28.

The hollow handle described hereinbefore is adapted to receive removably therein a collapsible landing net, a preferred embodiment of which is illustrated in Figure 2. The landing net includes a handle section 30, preferably constructed of light weight tubular metal such as aluminum. A plug 32 is secured in the forward end of the handle section 30 and carries a forward projection 34. Supported pivotally on the projection 34 is a pair of forwardly extending arms 36, 38. In order to provide maximum strength with minimum weight, these arms preferably are U-shaped in cross section (Figure 3) and positioned with the spaced edges 40, 42 facing inwardly toward each other. The rearward ends of the arms are provided with inwardly extending ears 44, 46, respectively, which overlap each other and are provided with axially aligned openings which register with an opening in the projection 34 for receiving the pivot pin 48 therethrough. In the embodiment illustrated, the pivot pin 48 is in the form of a rivet whose ends are enlarged to secure the arms to the projection 34.

A mesh net is constructed of crossed threads of filaments 50, thereby forming an open network which, when distended, occupies a substantial volume but which may be wadded or folded to an extremely small mass. The net is open at one end, and this end is secured to the arms 36, 38 in such manner that when the arms are spread apart (Figure 2) the open end of the net is distended for receiving fish therethrough. The open end of the net preferably is secured to the arms 36, 38 in the manner best illustrated in Figure 3, wherein the lower section of each of the U-shaped arms is provided with longitudinally spaced openings 52 adapted to receive therethrough the looped ends 54 of the converging filaments 50. A thread 56 is reeved through these loops to secure the net to the arms. In this manner the filaments 50 do not overlap the inwardly facing edges 42 of the arms, thereby permitting the latter to overlap when the arms are drawn together. Since the arms taper forwardly from the pivot 48 and hence overlap to a greater extent in the rearward direction, the openings 52 are positioned progressively farther from the edges 42 in the direction toward the pivot pin 48.

A wire spring 58 is looped intermediate its ends about the pivot pins 48, and its opposite ends project forwardly into engagement with the arms 36, 38, respectively. The outward tension of the spring tends to urge the arms apart, as indicated in Figure 2, whereby to provide automatic opening of the net upon removal from the fishing rod handle, in manner explained more fully hereinafter.

The rearward end of the handle 30 is enlarged to form a bearing 60 having a diameter substantially equal to the inner diameter of the rod section 10 adjacent the rearward end of sleeve 14. The terminal end of the bearing is provided with a cap 62 secured or otherwise formed integral therewith. The cap is provided with a cylindrical wall 64 which projects forwardly over the bearing 60 and is proportioned with an internal diameter substantially equal to the outer diameter of sleeve 14. Thus, an annular space is provided between the wall 64 and bearing 60 in which to receive the rearward end of the fishing rod handle comprising the rod section 10 and sleeve 14.

It is to be pointed out here that in the normal use of the landing net the fisherman holds the same by handle 30 in such position that the arms 36, 38 extend laterally, whereby the open end of the net may be dipped into the water. Accordingly, interengaging means is provided on the fishing rod handle and landing net to orient the latter in such manner that when removed from the handle the arms spread laterally without readjusting the grip of the hand on the handle 30. In the embodiment illustrated, the interengaging means comprises a pin 66 projecting radially outward from the sleeve 14 for engagement in an offset slot formed in the wall 64. The slot comprises two sections 68, 70 disposed substantially at right angles to each other, with slot 70 intercepting the forward edge of wall 64.

The position of slot 70 with respect to the pivot pin 48 and the position of pin 66 with respect to the fixed reel seat 16 is such that when the pin and slot are in line for engagement, the axis of pivot pin 48 intercepts the longitudinal axis of the reel seat 16. Stated otherwise, when so positioned the axis of pivot pin 48 is substantially parallel to the plane of reel 18. Thus, in operation, the fly rod is held in one hand with the reel 18 extending away from the fisherman, and the other hand grasps the cap wall 64 and pulls the landing net rearwardly from the handle. Since the pivot pin 48 is disposed substantially normal to the longitudinal axis of the reel seat, or parallel to the plane of the reel, the arms 36, 38 are swung laterally outward automatically under the tension of spring 58 and the open end of the net is displayed in proper position, facing upward.

In the embodiment illustrated, this arrangement is achieved by positioning the pin 66 diametrically opposite the reel seat 16, and positioning the releasing slot 70 in line with the axis of pin 48. This arrangement accommodates use of the net by right and left handed fishermen, with equal facility.

When folding the landing net for insertion into the fishing rod handle, it is desirable that the mesh net does not encircle the arms 36, 38, for otherwise automatic spreading of the arms upon subsequent removal of the net from the handle would be inhibited. It is understood, of course, that the mesh net may be wrapped around the arms after the latter have been pressed together and that the net may subsequently be unwound from the arms. However, the preferred procedure for collapsing the landing net is to swing the bottom end of the mesh net longitudinally outward and upward, in the plane of handle 30, and thence rearward over the open end between the spread arms 36, 38. In this manner the bottom end of the net is deposited across the open end of the net along the longitudinal axis of the handle 30. The arms 36, 38 then are pressed together to the positon shown in dashed lines in Figure 2, with the bulk of the mesh net depending downwardly therefrom. The terminal ends of the arms then are inserted in the rearward end of the fishing rod handle, and the landing net pushed forwardly therethrough. The mesh net compresses to such small bulk as to be readily contained within the hollow handle alongside the arms and handle of the net.

When stored within the handle of the fishing rod in the manner explained above, the fishing rod is manipulated in conventional manner. Since the fishing rod handle is not enlarged from conventional construction, and since the landing net is light in weight, the characteristics of balance and action of the fishing rod are not altered.

It will be apparent to those skilled in the art that various changes in the details of construction described hereinbefore may be made without departing from the scope and spirit of this invention. For example, in many types of fishing rods the handle is constructed as a separate unit and is attached to a fishing rod by means of interengaging threaded connections. Such handles generally are longer than the handle illustrated herein and are capable of receiving the landing net described hereinbefore. In such instances the separate handle functions as a carrying case for the net, but affords the added advantages discussed hereinbefore. As another example, the arms 36, 38 may be provided with spring steel sections adjacent the handle 30 and secured firmly to the latter, in place of the pivot connection illustrated. The spring steel sections may be biased normally outward to provide the function of the spring 58 illustrated. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. In combination, a fishing rod handle comprising a hollow, elongated container open at its rearward end, a separate landing net comprising a handle section, elongated arms having forward free ends, and rearward ends attached to said handle section, the arms being biased resiliently to diverge toward their forward ends, and an open-mesh net having an open end secured to said arms, the forward free ends of the arms being connected solely by a flexible edge of the net to permit the free and unobstructed opening and closing of the net, the landing net arms being movable toward each other against the resistance of their resiliency, the landing net arms, handle section and net being receivable within the hollow container, and the landing net arms being urged apart automatically to open the net when the landing net is separated from the container and to cause closing of the net solely by pressing the arms together when the net is to be restored to the container.

2. In combination, a fishing rod handle comprising an elongated hollow member open at its rearward end, a separate landing net comprising a handle section, elongated arms having forward ends, and rearward ends attached to said handle section, the arms being biased resiliently to diverge toward their forward ends, and an open mesh net having an open end secured to said arms, the landing net arms being movable toward each other against the resistance of their resiliency, the landing net arms, handle section and net being receivable within the hollow fishing rod handle through the open rearward end of the latter with the forward ends of the landing net arms being inserted into the container first after being drawn together, and the landing net arms being urged apart automatically to open the net when the landing net is separated from the fishing rod handle.

3. In combination, a fishing rod handle comprising an elongated hollow member open at its rearward end and having a reel seat fixed thereon and lying in a plane extending through the longitudinal axis of the rod handle, a landing net comprising a handle section, elongated arms extending forwardly therefrom, the arms being biased resiliently to diverge forwardly, an open mesh net having an open end secured to said arms, the landing net arms being movable toward each other against the resistance of their resiliency, the landing net arms, handle section and net being receivable within the hollow fishing rod handle through the open rearward end of the latter, and interengaging locking means on the fishing rod handle and landing net handle section, said locking means being so positioned that the landing net arms lie in a plane which is substantially normal to said first plane when the landing net is released for retraction from the fishing rod handle, and the landing net arms being urged apart automatically to open the net when the landing net is removed from the fishing rod handle.

4. In combination, a fishing rod handle comprising an elongated hollow member open at its rearward end and having a reel seat fixed thereon and lying in a plane extending through the longitudinal axis of the rod handle, a landing net comprising a handle section, elongated arms mounted pivotally at their rearward ends on the forward end of the handle section on the diametric axis of the handle, resilient means interengaging the arms and urging the latter apart, an open mesh net having an open end secured to said arms, the landing net arms being movable toward each other against the resistance of said resilient means, the landing net arms, handle section and net being receivable within the hollow fishing rod handle through the open rearward end of the latter, and inter-engaging locking means on the fishing rod handle and landing net handle section, said locking means being so positioned that the landing net arms lie in a plane which is substantially normal to said first plane when the landing net is released for retraction from the fishing rod handle, and the landing net arms being urged apart automatically to open the net when the landing net is removed from the fishing rod handle.

5. In combination, a fishing rod assembly comprising an elongated hollow handle member open at its rearward end and having a reel seat fixed thereon and lying in a plane extending through the longitudinal axis of the rod handle, a fishing rod connected to the handle and having a hollow rearward portion extending forwardly of the handle, a landing net comprising a handle section, elongated arms extending forwardly therefrom, the arms being biased resiliently to diverge forwardly, an open mesh net having an open end secured to said arms, the landing net arms being movable toward each other against the resistance of their resiliency, the landing net arms, handle section and net being receivable within the hollow fishing rod handle and fishing rod through the open rearward end of the handle, and interengaging locking means on the fishing rod handle and landing net handle section, said locking means being so positioned that the landing net arms lie in a plane which is substantially normal to said first plane when the landing net is released for retraction from the fishing rod handle, and the landing net arms being urged apart automatically to open the net when the landing net is removed from the fishing rod handle.

References Cited in the file of this patent

UNITED STATES PATENTS

| | | |
|---|---|---|
| 1,920,790 | Hendrie | Aug. 1, 1933 |
| 2,544,926 | Keeney | Mar. 13, 1951 |
| 2,683,949 | Berezansky | July 20, 1954 |
| 2,727,328 | Dunton | Dec. 20, 1955 |

FOREIGN PATENTS

| | | |
|---|---|---|
| 23,204 | Great Britain | Nov. 11, 1905 |
| 67,782 | Norway | Apr. 24, 1944 |